Sept. 5, 1950   E. W. CORRIGAN ET AL   2,521,567
THREADLESS LOCKNUT AND BOLT
Filed Feb. 12, 1947
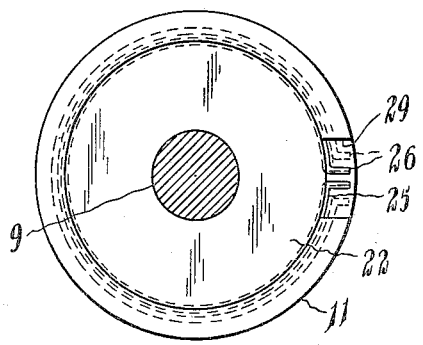
Fig. 1.
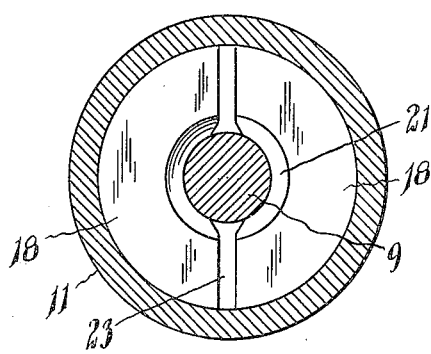
Fig. 4.
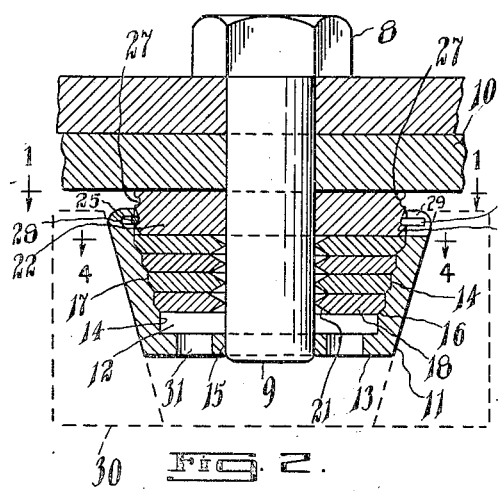
Fig. 2.
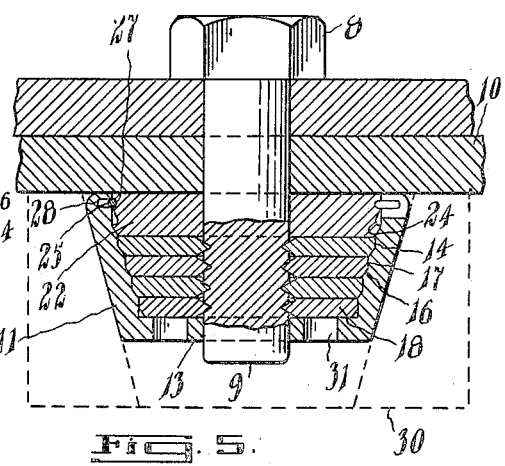
Fig. 5.
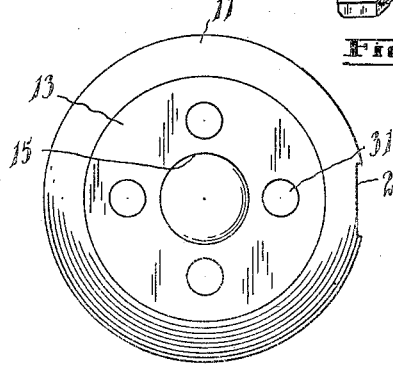
Fig. 3.
Fig. 7.
Fig. 6.
Inventor
Elwyn Watt Corrigan
William R. Lindner
By Frederick E. Bromley
Attorney Patented Sept. 5, 1950

2,521,567

UNITED STATES PATENT OFFICE 2,521,567

THREADLESS LOCK NUT AND BOLT

Elwyn Watt Corrigan, Hamilton, Ontario, and William R. Lindner, Ancaster, Ontario, Canada Application February 12, 1947, Serial No. 728,080

2 Claims. (Cl. 85—32)

The invention relates in general to fasteners of the lock-nut type and particularly to improvements in means for effectively holding a nut locked on a bolt or the like.

The paramount object of the invention is to provide a fastener of the kind referred to, in which a recessed nut body is provided with an internal arrangement of wedging faces against which wedge plates are forced by inward pressure imparted to a backing plate whereby to cause the wedge plates to effectively lock the fastener on the shank of a bolt or the like.

A further object of the present invention is to provide a locking device of this character in which the parts are loosely retained in assembled relation by means of a split ring seated in a groove sloping upwardly at one side to a second groove into which the split ring slides as the wedge plates are brought into a locking position. According to this arrangement the split ring also retains the assemblage when the wedge plates lock the fastener on the bolt and enables the fastener to be unlocked at will for removal from the bolt.

A still further and important object of the invention is to provide a locking device as herein set out which is designed to be used on a plain shank of a bolt, i. e., one that is not made with threads. To this end the wedge plates are supplied with sharp teeth for biting into the plain shank to prevent backward movement of the locking device.

The invention provides a highly efficient and serivceable fastener which is inexpensive to manufacture.

A selected form of the invention is illustrated in the accompanying drawing in which:

Fig. 1 is a cross section on line 1—1 of Fig. 2.

Fig. 2 is a longitudinal section showing the fastener of the present invention placed on a bolt but not locked thereto.

Fig. 3 is an outer end elevation of the fastener.

Fig. 4 is a cross section of the fastener taken on line 4—4 of Fig. 2.

Fig. 5 is a sectional view similar to Fig. 2 but showing the fastener in locked position on the bolt.

Fig. 6 is a similar cross section to Fig. 4 but shows the fastener locked on the bolt by means of the wedge plates, as in Fig. 5.

In the drawing, the invention is illustrated by way of example but not of limitation as comprising a fastener in the form of a nut having several sets of wedge plates for locking it on the plain shank of a bolt in order to hold objects through which the bolt is inserted. The bolt is indicated at 8 and its plain shank is denoted at 9. The term "plain shank" is intended to mean one not made with threads. The nut is applied to the protruding end of the shank and the objects held, indicated by the reference numeral 10, are merely shown to give a better understanding of the invention.

The nut of the present invention comprises a body 11 provided with a chamber 12 extending inwardly from its inner side to the radial wall 13 at the outer side. In the present instance the recess or chamber is substantially conical and supplied with a series of steps 14. The bore diminishes toward said wall 13 which is centrally pierced as at 15 receptive to the shank 9 which passes freely therethrough.

The steps 14 are of annular configuration and each with the exception of the innermost one is formed with an inner wedge face, as at 16, and an outer thrust face 17 which is straight, or in other words, of uniform diameter.

The wedge plates 18 are made up in sets, there being preferably two of them to a set, each being of an arcuate shape to form a segment of a ring, as best discernible from an inspection of Fig. 7. The wedge plates form substantially semi-circular elements and those of each set are of a diameter to correspond to a step of the bore 12 of the nut body and have a beveled edge 19 for mating with the wedge face 16 thereof. The central recess 20 of a wedge plate enables it to partly encircle the shank and presents an edge which is sharpened to a cutting-edge 21 for biting into the shank. Said cutting edge conforms in circularity to the diameter of said shank.

As represented in Fig. 2, in assembly, the sets of wedge plates are seated in the chamber 12 with their beveled edges 19 engaged with the wedge faces 16 of the respective steps 14 and are loosely retained by a backing plate 22. In this arrangement the cutting edges 21 of the wedge plates surround the shank and there is a gap, indicated at 23, Fig. 4, between the two wedge plates of a set in order that they may approach each other more closely in the locking operation whereby they are forced to bite into the shank.

Said backing plate is located at the inner end of the nut-body to bear against the adjacent face of the material 10 to be held by the bolt. The backing plate is an apertured disk which is a slide fit in the wide end of the chamber. A groove 24 extends around the backing plate and has tensioned in it a wire retaining ring 25 of the split type whose ends 26 are turned outwardly to form grip pieces. The outer side of groove 24 is gradually sloped upwardly to a second groove, denoted at 27, The retaining ring 25 is also engaged in a deep groove 28 formed in the inner end of the nut-body which permits the ring to expand therein. A notch 29 receives the grip pieces 26 of the ring for the use of an appropriate expanding tool.

The retaining ring serves to hold the backing plate loosely assembled in the nut-body along with the wedge plates when the nut is not locked on the bolt. To lock the nut pressure is applied on the body 11 thereof to cause the backing plate to force the wedge plates inwardly. In this operation the wedging faces drive the cutting edges into biting engagement with the shank and the wedge plates have displacing movement toward the inner end of the chamber. As the backing plate slides inwardly the retaining ring is forced into the outer groove 27 and thus the parts are secured in locked condition to preclude backward movement of the nut on the bolt—see Fig. 5. In the locked positions of the wedge plates the outer edges thereof are seated against the straight sections of the stepped bore 12 which positively prevents their outward movement. In the locking operation the required pressure can be conveniently applied on the body 11 by means of a tool such as that indicated at 30 in dash lines, for which purpose the body may be of the shape of a frustum of a cone. The outer end 13 of the body 11 is desirably provided with holes 31. To remove the nut it is merely necessary to expand the retaining ring 25 by forcing its end pieces apart, which unlocks the backing plate 22 and enables the wedge plates to be dislodged by forcing the body 11 away from the secured elements 10.

The invention provides a highly efficient and serviceable lock nut in which one or more sets of wedge plates may be employed. The nut may be applied to a bolt-shank, stud or similar connecting element.

What is claimed is:

1. A lock nut comprising a body provided with a chamber having a diametrically stepped surface including a wedge face, wedge plates radially disposed in said chamber and forcible radially by said wedge face for locking engagement with a shank of a bolt or the like, a backing plate in said chamber, said backing plate provided with a first groove and a second groove, said first groove having a side wall gradually sloping toward said second groove, a split resilient ring seated in said first groove and also fitted in a groove provided in said chamber whereby to retain the wedge plates and the backing ring loosely assembled in the said body, said ring being adapted to slide into said second groove when the backing plate and said body are pressed together to effect said locking engagement.

2. A lock nut comprising a body recessed from an inner end to provide an annular chamber reduced by a series of steps each of a uniform diameter and having a bevel face at its outer end, sets of radial wedge plates having inner and outer radial sides and disposed in said chamber, each set forming segments of a ring, said sets being of stepped diameters to correspond with said steps of said chamber and the wedge plates of each set having peripheral bevel faces at said outer radial sides for engaging the bevel face of the corresponding step to cause said wedge plates to move inwardly radially of said chamber with an accompanying axial movement to engage a different step when axial pressure is applied, and a backing plate releasably retained in said chamber inwardly of said sets of wedge plates.

ELWYN WATT CORRIGAN.
WILLIAM R. LINDNER.

REFERENCES CITED

The following references are of record in the file of this patent:

UNITED STATES PATENTS

| Number | Name | Date |
| --- | --- | --- |
| 705,571 | Ferguson | July 29, 1902 |
| 1,560,701 | Layton | Nov. 10, 1925 |
| 1,611,210 | Liddell | Dec. 21, 1926 |
| 1,749,945 | Kaough | Mar. 11, 1930 |
| 2,489,613 | Beswick | Nov. 29, 1949 |

FOREIGN PATENTS

| Number | Country | Date |
| --- | --- | --- |
| 31,311 | Denmark | Feb. 8, 1923 |